(12) United States Patent
Wu

(10) Patent No.: US 12,143,838 B2
(45) Date of Patent: Nov. 12, 2024

(54) PROCESSING METHOD AND TERMINAL

(71) Applicant: VIVO MOBILE COMMUNICATION CO., LTD., Guangdong (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 644 days.

(21) Appl. No.: 17/241,597

(22) Filed: Apr. 27, 2021

(65) Prior Publication Data

US 2021/0250789 A1 Aug. 12, 2021

Related U.S. Application Data

(63) Continuation of application No. PCT/CN2019/108888, filed on Sep. 29, 2019.

(30) Foreign Application Priority Data

Oct. 31, 2018 (CN) .......................... 201811286976.4

(51) Int. Cl.
*H04W 24/04* (2009.01)
(52) U.S. Cl.
CPC .................................. *H04W 24/04* (2013.01)
(58) Field of Classification Search
CPC ..... H04W 24/04; H04W 76/15; H04W 76/19; H04W 76/18; H04W 76/12
See application file for complete search history.

(56) References Cited

U.S. PATENT DOCUMENTS

| 2015/0326456 | A1 | 11/2015 | Dudda et al. |
| 2017/0318606 | A1* | 11/2017 | Lee ..................... H04W 74/006 |
| 2018/0184482 | A1 | 6/2018 | Susitaival et al. |
| 2018/0255488 | A1 | 9/2018 | Kim et al. |
| 2018/0278357 | A1* | 9/2018 | Kim ..................... H04J 11/0076 |

(Continued)

FOREIGN PATENT DOCUMENTS

| CN | 105871519 A | 8/2016 |
| CN | 107079514 A | 8/2017 |

(Continued)

OTHER PUBLICATIONS

Ericsson, "SCell RLF discussion (TP to 38.331)", 3GPP Draft; R2-1807037; 3GPP Tsg-Ran WG2 #102; May 25, 2018. Section 2, 3, 5.7.N. (Year: 2018).*

(Continued)

*Primary Examiner* — Huy D Vu
*Assistant Examiner* — Robert Ma
(74) *Attorney, Agent, or Firm* — Harness, Dickey & Pierce, P.L.C.

(57) ABSTRACT

A processing method includes: performing a target operation when data transmission on a target transmission path in the M transmission paths fails, where the target operation includes at least one of: reporting failure indication information; performing a first operation on a target radio link control (RLC) entity corresponding to the target transmission path; performing a second operation on a target medium access control (MAC) entity corresponding to the target transmission path; performing a third operation on a target SCell corresponding to the target transmission path; or performing a fourth operation on the target split bearer.

18 Claims, 6 Drawing Sheets

Perform a target operation when data transmission on a target transmission path in M transmission paths fails, where the target operation includes at least one of the following: reporting failure indication information; performing a first operation on a target radio link control RLC entity corresponding to the target transmission path; performing a second operation on a target medium access control MAC entity corresponding to the target transmission path; performing a third operation on a target SCell corresponding to the target transmission path; and performing a fourth operation on a target split bearer. — 401

(56) References Cited

U.S. PATENT DOCUMENTS

| | | | | |
|---|---|---|---|---|
| 2019/0393989 | A1* | 12/2019 | Jung | H04W 24/02 |
| 2020/0037382 | A1 | 1/2020 | Xiao et al. | |
| 2020/0120522 | A1* | 4/2020 | Xiao | H04W 24/08 |
| 2021/0195444 | A1* | 6/2021 | Teyeb | H04W 24/04 |

FOREIGN PATENT DOCUMENTS

| | | |
|---|---|---|
| CN | 107690162 A | 2/2018 |
| CN | 108307538 A | 7/2018 |
| CN | 108632869 A | 10/2018 |
| CN | 109215978 A | 1/2019 |
| EP | 3249843 A1 | 11/2017 |
| EP | 3249997 A1 | 11/2017 |

OTHER PUBLICATIONS

Second Office Action regarding Chinese Patent Application No. 201811286976.4, dated Jun. 10, 2021. Translation provided by Bohui Intellectual Property.
"UE layer-2 behaviors at SCell-failure," vivo, 3GPP TSG-RAN WG2 Meeting #100, R2- 1713009, dated Dec. 1, 2017.
"PDCP data duplication in LTE," Nokia, 3GPP TSG-RAN WG2 #99bis, R2-1711001, dated Oct. 13, 2017.
Supplementary European Search Report regarding Application No. 19879297.0—1212/3876583, PCT/CN2019/108888, dated Nov. 23, 2021.
"SCell RLF discussion (TP to 38.331)," Ericsson, 3GPP TSG-RAN WG2 #102, R2-1807037 (Revision of R2-1804793), dated May 25, 2018.
"3rd Generation Partnership Project; Technical Specification Group Radio Access Network; NR; Radio Resource Control (RRC) protocol specification (Release 15)," 3GPP TS 38.331 V15.1.0, Mar. 2018.
"PDCP duplication," Qualcomm Incorporated, 3GPP TSG-RAN WG2 Meeting #101, R2-1803116 (revision of R2-1801244), dated Mar. 2, 2018.
First Office Action regarding Japanese Patent Application No. 2021-522381, dated Apr. 13, 2022. Translation provided.
Second Office Action regarding Japanese Patent Application No. 2021-522381, dated Sep. 28, 2022. Translation provided.
"UE behavior upon SCell-failure of PDCP duplication," vivo, 3GPP TSG-RAN WG2 Meeting #101bis, R2-1804596, dated Apr. 20, 2018.
"L2 impacts on RLC failure," vivo, 3GPP TSG-RAN WG2 Meeting #102, R2-1807587, dated May 25, 2018.
Change Request to "NR Corrections (37.340 Baseline CR covering RAN3-101 agreements)," ZTE, 3GPP TSG-RAN WG2 #103, R2-1813141 was R3-185329, dated Aug. 24, 2018.
"Report of [103#45][NR] RLC failure information reporting (Samsung)," Samsung, 3GPP TSG-RAN WG2 #103 bis, R2-1814746, dated Oct. 12, 2018.
"Message and procedure for providing RLC failure/RLF Information in NR (RIL# E143)," Samsung, 3GPP TSG-RAN WG2 meeting #103, R2-1812164 (Revision of R2-1810768), dated Aug. 24, 2018.
International Search Report and Written Opinion of the International Searching Authority regarding International Patent Application No. PCT/CN2019/108888, dated Dec. 20, 2019. Translation provided by Bohui Intellectual Property.
First Office Action regarding Chinese Patent Application No. 201811286976.4, dated Nov. 23, 2020. Translation provided by Bohui Intellectual Property.
"RLF on the duplication leg," OPPO, 3GPP TSG RAN WG2 #99 R2-10707746, dated Aug. 21, 2017.

* cited by examiner

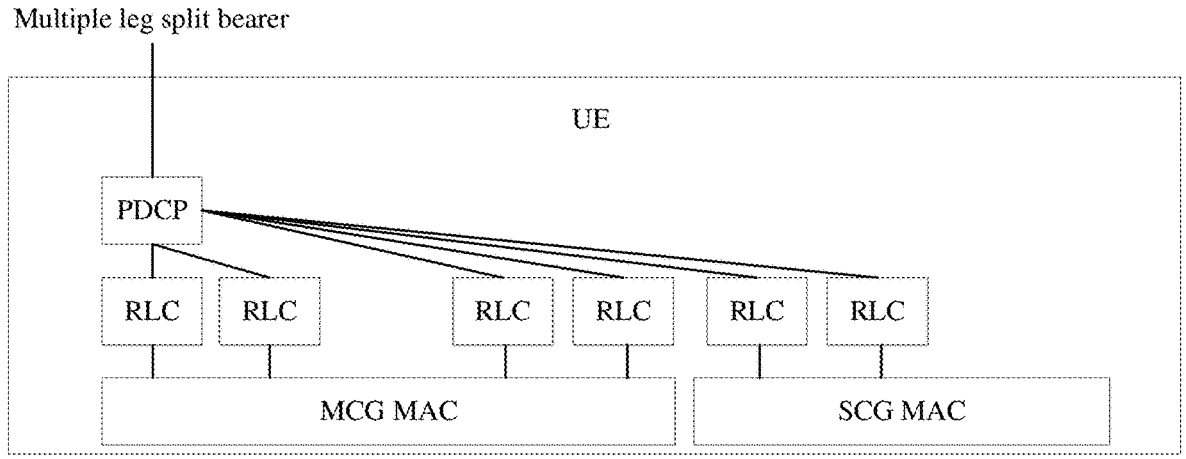

FIG. 3B

Perform a target operation when data transmission on a target transmission path in M transmission paths fails, where the target operation includes at least one of the following: reporting failure indication information; performing a first operation on a target radio link control RLC entity corresponding to the target transmission path; performing a second operation on a target medium access control MAC entity corresponding to the target transmission path; performing a third operation on a target SCell corresponding to the target transmission path; and performing a fourth operation on a target split bearer. — 401

FIG. 4

PROCESSING METHOD AND TERMINAL

CROSS-REFERENCE TO RELATED APPLICATIONS

This application is a Bypass Continuation Application of PCT/CN2019/108888 filed on Sep. 29, 2019, which claims priority to Chinese Patent Application No. 201811286976.4 filed on Oct. 31, 2018, which are incorporated herein by reference in their entirety.

TECHNICAL FIELD

Embodiments of this application relate to the field of communications technologies, and in particular, to a processing method and a terminal.

BACKGROUND

With the development of mobile communications technologies, a dual connectivity (DC) architecture is used in a mobile communications system, for example, a 5th generation (5G) mobile communications system, for data transmission. In the DC architecture, two cell groups are included, namely, a master cell group (MCG) and a secondary cell group (SCG). In addition, a bearer type may include a split bearer.

For the split bearer, a packet data convergence protocol (PDCP) entity corresponding to the split bearer is located in one cell group, radio link control (RLC) entities corresponding to the split bearer may be located in different cell groups, and medium access control (MAC) entities corresponding to the split bearer may be located in different cell groups.

However, currently, for a scenario in which data transmission on a transmission path corresponding to the split bearer fails, there is no definition about processing behavior of a terminal. It can be learned that data transmission performance of a split bearer in a related technology is poor.

SUMMARY

According to a first aspect, an embodiment of this application provides a processing method, applied to a terminal, where N transmission paths are configured for a target split bearer corresponding to the terminal, data transmission on M transmission paths in the N transmission paths is performed by using a secondary cell SCell, N is an integer greater than or equal to 2, M is a positive integer less than or equal to N, and the method includes:

performing a target operation when data transmission on a target transmission path in the M transmission paths fails, where the target operation includes at least one of:

reporting failure indication information;

performing a first operation on a target radio link control RLC entity corresponding to the target transmission path;

performing a second operation on a target medium access control MAC entity corresponding to the target transmission path;

performing a third operation on a target SCell corresponding to the target transmission path; or performing a fourth operation on the target split bearer.

According to a second aspect, an embodiment of this application further provides a terminal, where N transmission paths are configured for a target split bearer corresponding to the terminal, data transmission on M transmission paths in the N transmission paths is performed by using a secondary cell SCell, N is an integer greater than or equal to 2, M is a positive integer less than or equal to N, and the terminal includes:

an execution module, configured to perform a target operation when data transmission on a target transmission path in the M transmission paths fails, where the target operation includes at least one of:

reporting failure indication information;

performing a first operation on a target radio link control RLC entity corresponding to the target transmission path;

performing a second operation on a target medium access control MAC entity corresponding to the target transmission path;

performing a third operation on a target SCell corresponding to the target transmission path; or performing a fourth operation on the target split bearer.

According to a third aspect, an embodiment of this application further provides a terminal. The terminal includes a processor, a memory, and a computer program that is stored in the memory and executable on the processor, and when the computer program is executed by the processor, steps of the processing method described above are implemented.

According to a fourth aspect, an embodiment of this application further provides a non-transitory computer readable storage medium. The non-transitory computer readable storage medium stores a computer program. When the computer program is executed by a processor, steps of the processing method described above are implemented.

DESCRIPTION OF DRAWINGS

To describe the technical solutions in the embodiments of this application more clearly, the following briefly describes the accompanying drawings required in the embodiments of this application. Apparently, the accompanying drawings in the following descriptions show merely some embodiments of this application, and a person of ordinary skill in the art may still derive other drawings from these accompanying drawings.

FIG. 3B is a fourth schematic diagram of a bearer according to an embodiment of this application;

FIG. 4 is a first flowchart of a bearer control method according to an embodiment of this application;

DETAILED DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Terms "first" and "second" in this application are used to distinguish between similar objects, and do not need to be used to describe a specific order or sequence. In addition, terms "include". "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

Figure 1:
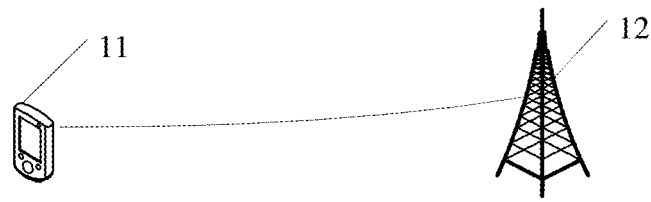
FIG. 1 is a structural diagram of a network system to which embodiments of this application can be applied.

FIG. 1 is a structural diagram of a network system to which the embodiments of this application can be applied. As shown in FIG. 1, the network system includes a terminal 11 and a network side device 12. The terminal 11 and the network side device 12 may communicate with each other by using a network.

In this embodiment of this application, the terminal 11 may be alternatively referred to as user equipment (UE). During specific implementation, the terminal 11 may be a terminal side device such as a mobile phone, a tablet personal computer, a laptop computer, a personal digital assistant (PDA), a mobile internet device (MID), a wearable device, or a vehicle-mounted device. It should be noted that a specific type of the terminal 11 is not limited in this embodiment of this application.

The network side device 12 may be a base station, a relay, an access point, or the like. For example, the network side device 12 may be a serving base station in a single connectivity architecture, a master node in a multi connectivity architecture, or a secondary node in a multi connectivity architecture. The base station may be a base station (for example, a 5G NR NB) of 5G and a later version, or a base station (for example, an evolved NodeB (eNB)) in another communications system. It should be noted that a specific type of the network side device 12 is not limited in this embodiment of this application.

For case of description, the following describes some content in the embodiments of this application:
1. Introduction to a PDCP Duplication Function A network side device may configure a data duplication function for an RB of UE, and a PDCP layer executes the function. If a data duplication function of an RB is activated, a PDCP layer corresponding to the RB duplicates data needing to be delivered to a lower layer, and sends the original data and the duplicate data respectively by using two different transmission paths, for example, two different radio link control (RLC) entities, and different RLC entities correspond to different logical channels.

In an implementation, the network side device may instruct, based on medium access control element (MAC CE) signaling, that the PDCP data duplication function be started (namely, activated) or stopped (namely, deactivated).

In another implementation, when configuring a data duplication function of an RB, the network side device may configure whether the function is started immediately after being configured, so that there is no need to instruct, by using MAC CE signaling, that the PDCP duplication function be activated or deactivated.

2. Bearer Type of a PDCP Duplication Function

A DC architecture is used in a fifth generation (5G) mobile communications system. The DC architecture includes two cell groups, namely, a master cell group (MCG) and a secondary cell group (SCG).

The MCG corresponds to a master node (MN) of the network side device, and the SCG corresponds to a secondary node (SN) of the network side device. An MAC entity in the MCG may be referred to as an MCG MAC entity, and a MAC entity in the SCG may be referred to as an SCG MAC entity. The network side device may configure multiple signaling radio bearers (SRB) for UE, where the multiple signaling radio bearers include an SRB1 and an SRB2 configured in the MCG and an SRB3 configured in the SCG.

The bearer type of the PDCP duplication function may include at least the following two bearers:

Split bearer: For a same split bearer, a PDCP entity corresponding to the split bearer is located in one cell group, two RLC entities corresponding to the split bearer are located in different cell groups, and two MAC corresponding to the split bearer are located in different cell groups.

Figure 2A:
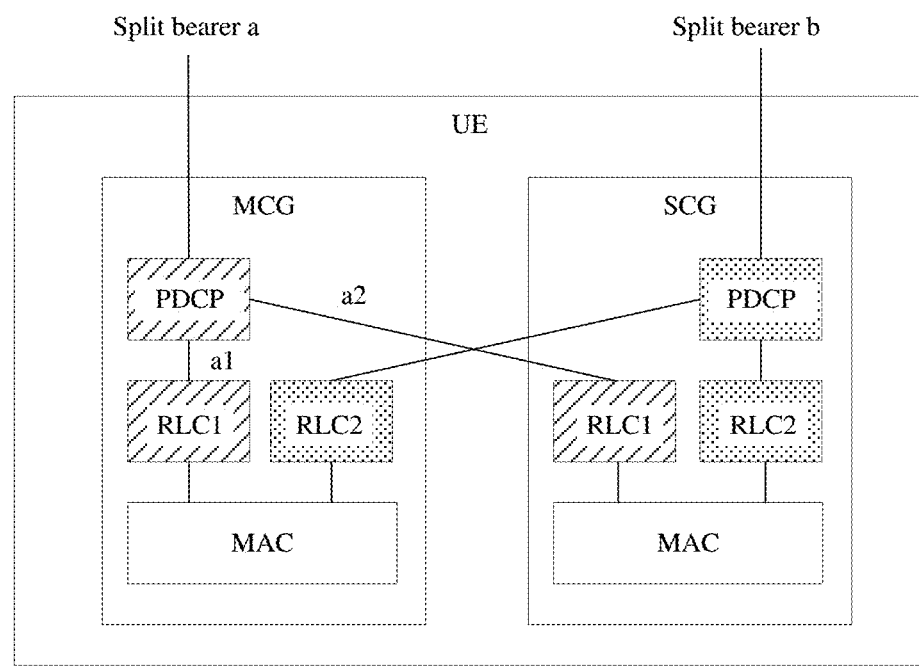
FIG. 2A is a first schematic diagram of a bearer according to an embodiment of this application.

For example, as shown in FIG. 2A, a split bearer a is used as an example for description. A transmission path a1 and a transmission path a2 are configured for the split bearer a. The transmission path a1 corresponds to a PDCP entity in an MCG, an RLC entity 1 in the MCG, and a MAC entity in the MCG. The transmission path a2 corresponds to the PDCP entity in the MCG, an RLC entity 1 in an SCG, and a MAC entity in the SCG.

Duplicate bearer: For a same duplicate bearer, one PDCP entity, two RLC entities, and one MAC entity that correspond to the duplicate bearer are located in one cell group.

Figure 2B:
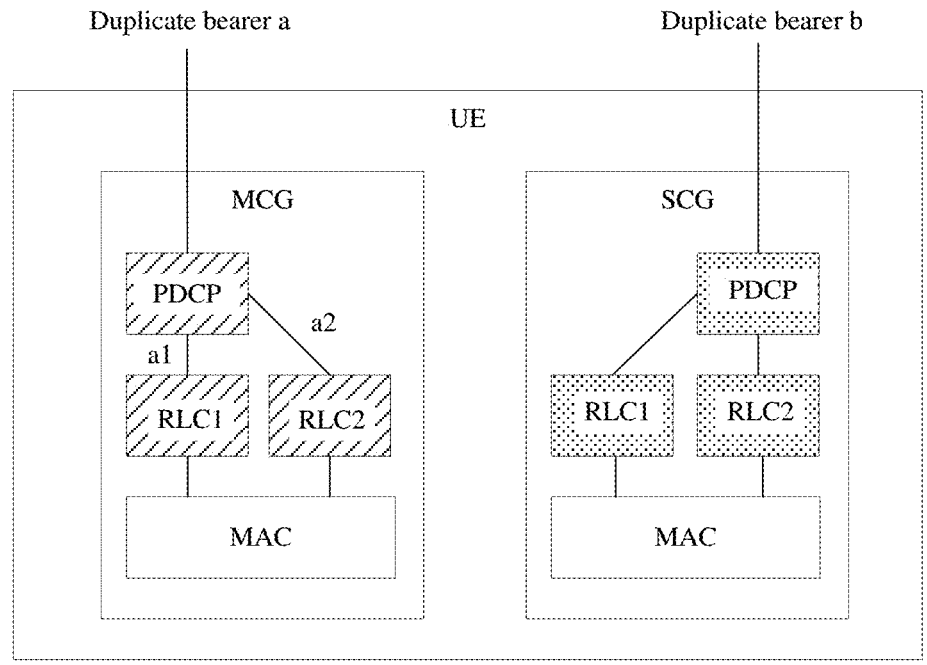
FIG. 2B is a second schematic diagram of a bearer according to an embodiment of this application.

For example, as shown in FIG. 2B, a duplicate bearer a is used as an example for description. A transmission path a1 and a transmission path a2 are configured for the duplicate bearer a. The transmission path a1 corresponds to a PDCP entity in an MCG, an RLC entity 1 in the MCG, and a MAC entity in the MCG. The transmission path a2 corresponds to the PDCP entity in the MCG, an RLC entity 2 in the MCG, and the MAC entity in the MCG.

In addition, for the duplicate bearer, data from different RLC entities may be sent by using different cells, and a cell used to transmit data may be a secondary cell (SCell) or a primary cell (PCell).

It should be noted that in this embodiment of this application, if RLC entities corresponding to a bearer are distributed in different cell groups, the bearer may be referred to as a split bearer, and if RLC entities corresponding to a bearer are distributed in a same cell, the bearer may be referred to as a duplicate bearer. The standardization organization may provide other names. This application is not limited to the names.

3. Multiple Leg PDCP Data Duplication (Multiple Leg PDCP Duplication)

For a PDCP data duplication function, more than two transmission paths may be configured for an RB. Because a transmission path may correspond to an only RLC entity, it may be understood that a PDCP entity corresponding to the RB may correspond to more than two RLC entities.

Figure 3A:
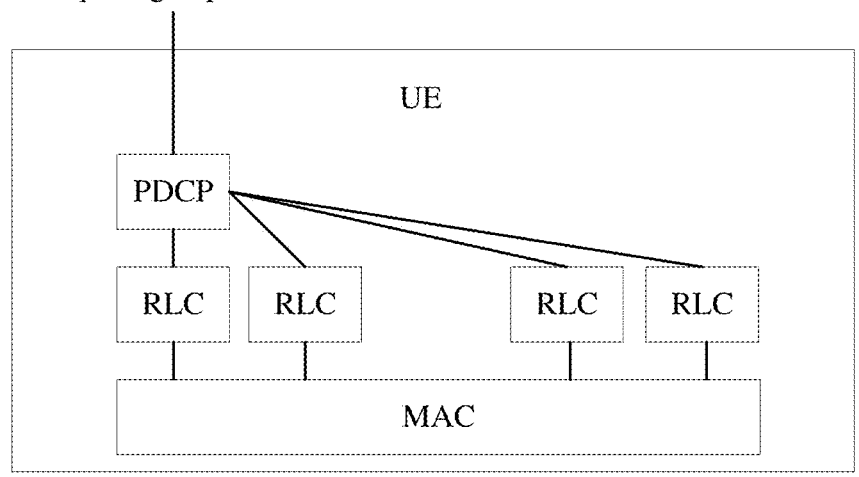
FIG. 3A is a third schematic diagram of a bearer according to an embodiment of this application.

For case of understanding, refer to FIG. 3A and FIG. 3B together. As shown in FIG. 3A, a PDCP entity of a multiple leg duplicate bearer corresponds to four RLC entities. It may be understood that four transmission paths are configured for the multiple leg duplicate bearer. As shown in FIG. 3B, a PDCP entity of a multiple leg split bearer corresponds to six RLC entities. It may be understood that six transmission paths are configured for the multiple leg split bearer.

During specific implementation, the network side device may choose to deactivate one or more transmission paths. For example, in a scenario in which three transmission paths are configured for an RB, one path may be deactivated, and two paths still may work. In this scenario, the deactivated transmission path is not used for data transmission (receiving or sending), and the PDCP duplication function still may transmit data by using the activated paths. In other words, for the deactivated path, the UE cannot send data by using a logical channel corresponding to the transmission path, and for the activated transmission path, the UE may send data by using a logical channel corresponding to the transmission path.

For a split bearer architecture, after the network side device configures a PDCP data duplication function for a split bearer, for multiple transmission paths of one MAC entity, the network side device may configure that data on one or more transmission paths corresponding to the split bearer corresponding to the MAC entity is transmitted only by using a SCell, so that duplicate data can be transmitted in different cells. When data transmission on the transmission path fails, how UE performs processing is a problem needing to be resolved. Therefore, the embodiments of this application provide a processing method, to configure processing behavior of UE in the scenario, to improve data transmission performance.

The following describes the processing method in the embodiments of this application.

FIG. 4 is a first flowchart of a processing method according to an embodiment of this application. The processing method in this embodiment may be applied to a terminal. N transmission paths are configured for a target split bearer corresponding to the terminal, data transmission on M transmission paths in the N transmission paths is performed by using a secondary cell SCell, N is an integer greater than or equal to 2, and M is a positive integer less than or equal to N.

As shown in FIG. 4, the processing method in this embodiment includes the following steps.

Step 401. Perform a target operation when data transmission on a target transmission path in the M transmission paths fails.

In this embodiment of this application, data on the M transmission paths can be transmitted only by using the SCell. During implementation, when MAC entities respectively corresponding to the M transmission paths execute logical channel prioritization (LCP), logical channels respectively corresponding to the M transmission paths can be allocated an uplink resource of an uplink grant only when the uplink grant is an uplink grant of a specified SCell (for example, an SCell of a network side device), so that data is transmitted on the allocated uplink resource.

In addition, it should be understood that the target transmission path may be i transmission paths in the M transmission paths, where i is a positive integer less than or equal to M.

The target operation includes at least one of:
reporting failure indication information;
performing a first operation on a target radio link control RLC entity corresponding to the target transmission path;
performing a second operation on a target medium access control MAC entity corresponding to the target transmission path;
performing a third operation on a target SCell corresponding to the target transmission path; or performing a fourth operation on the target split bearer.

For a scenario of reporting the failure indication information, during specific implementation, the UE may report the failure indication information by using an SRB. Whether the UE reports the failure indication information by using an SRB configured for an MCG or an SRB of an SCG may be determined by using a cell group in which the MAC entity corresponding to the target transmission path is located and based on whether an SRB is configured for the cell group.

Optionally, the reporting failure indication information includes:
when the target transmission path corresponds to a MAC entity in the master cell group MCG, reporting the failure indication information by using a signaling radio bearer SRB configured for the MCG group; or
when the target transmission path corresponds to a MAC entity in the secondary cell group SCG and an SRB is configured for the SCG, reporting the failure indication information by using an SRB configured for the secondary cell group; or
when the target transmission path corresponds to a MAC entity in the SCG, but no SRB is configured for the SCG, reporting the failure indication information by using an SRB configured for the MCG.

It should be understood that in this embodiment of this application, reporting the failure indication information may be understood as reporting the failure indication information to the network side device. The network side device may be an MN in a dual connectivity architecture or an SN in a dual connectivity architecture. This is specifically determined based on an actual status.

When the target transmission path corresponds to the MAC entity in the master cell group MCG, the network side device is an MN in the dual connectivity architecture. Therefore, the UE needs to send the failure indication information to the MN in the dual connectivity architecture. In this scenario, the UE may report the failure indication information by using the SRB (for example, an SRB1 or an SRB2) configured for the MCG, and the MN receives the reported failure indication information.

When the target transmission path corresponds to the MAC entity in the secondary cell group SCG, the network side device is an SN in the dual connectivity architecture. Therefore, the UE needs to send the failure indication information to the SN in the dual connectivity architecture. In this scenario, because there is a possibility that no SRB is configured for the SCG, it needs to be further determined whether an SRB is configured for the SCG, and an SRB used for reporting the failure indication information is determined with reference to a determining result.

If an SRB (for example, an SRB3) is configured for the SCG, the UE may report the failure indication information by using the SRB configured for the SCG, and the SN receives the reported failure indication information.

If no SRB is configured for the SCG, the UE may report the failure indication information by using the SRB configured for the MCG, and the MN receives the reported failure indication information. Then, the MN may forward, to the SN, the failure indication information reported by the UE.

In this way, reliability of reporting the failure indication information can be improved, to improve data transmission performance.

In this embodiment of this application, optionally, a triggering event of a failure of data transmission on the target transmission path includes at least one of:

a quantity of times of retransmission of the target RLC entity reaches a largest quantity of times of retransmission;

a failure occurs at a physical layer of the target SCell;

a random access process of the target SCell fails; or a beam failure occurs in the target SCell.

In other words, if the UE detects that the quantity of times of retransmission of the target RLC entity reaches the largest quantity of times of retransmission, it may be regarded as that data transmission on the target transmission path fails; and/or if the UE detects that a failure occurs at the physical layer of the target SCell, or the random access process fails, or a beam failure occurs, it may be regarded as that data transmission on the target transmission path fails.

That the failure occurs at the physical layer may be understood as that a problem occurs at the physical layer or the physical layer is out of synchronization. During implementation, the UE may start a timer after detecting multiple consecutive out of synchronization indications of the physical layer. During running of the timer, if the UE detects multiple consecutive synchronous indications of the physical layer, the UE may stop the timer. If the timer expires, the UE may consider that a problem occurs at the physical layer or the physical layer is out of synchronization.

In a scenario in which the target operation includes reporting the failure indication information, optionally, the performing a target operation when data transmission on a target transmission path in the M transmission paths fails includes:

when the target operation includes reporting the failure indication information, reporting the failure indication information if first indication information instructs the terminal to report the failure indication information and data transmission on the target transmission path in the M transmission paths fails, where the first indication information is used to instruct the terminal to report the failure indication information or not to report the failure indication information.

In this scenario, if the first indication information is used to instruct the terminal not to report the failure indication information, the UE does not report the failure indication information.

It should be noted that the first operation, the second operation, the third operation, and the fourth operation may not be affected by the first indication information. For the first operation, the second operation, the third operation, and the fourth operation, regardless of whether the first indication information instructs the terminal to report the failure indication information, the UE can perform the first operation, the second operation, the third operation, and/or the fourth operation when data transmission on the target transmission path fails.

Further, the first indication information is configured by the network side device, or predefined in a protocol.

For a scenario in which the first indication information is configured by the network side device, the network side device may pre-send the first indication information to the terminal, to instruct the terminal to report the failure indication information or not to report the failure indication information. In this way, the network side device may determine specific indication content of the first indication information based on an actual requirement, and then deliver the first indication information to the terminal, to improve indication flexibility of the first indication information.

The network side device may include an MN in a dual connectivity architecture and/or an SN in a dual connectivity architecture. This is specifically determined based on an actual status. This is not limited in this embodiment of this application.

In a scenario in which the first indication information is predefined in the protocol, the first indication information may be predefined in a communications protocol. In this way, the UE can directly extract the first indication information from the protocol, and does not need to determine, based on an indication of the network side device, whether to report the failure indication information, to reduce system overheads.

Specific content included in the failure indication information in the target operation and specific representation forms of the first operation, the second operation, the third operation, and the fourth operation are specifically described below.

Optionally, the failure indication information includes at least one of:

an identifier of a cell corresponding to the target transmission path;

an identifier of a cell group corresponding to the target transmission path;

an identifier of the target split bearer;

an identifier of the target RLC entity;

an identifier of a logical channel of the target RLC entity;

an identifier of a logical channel group to which the logical channel of the target RLC entity belongs;

a measurement result of a cell of the target RLC entity;

measurement results of all serving cells;

measurement results of cells of all serving frequencies;

a measurement result of a serving cell of a cell group corresponding to the target transmission path;

a measurement result of a cell of a serving frequency of the cell group corresponding to the target transmission path; or a measurement result of a cell of a non-serving frequency.

The measurement result may include at least one of: a measurement result of a cell or a measurement result of a beam of a cell.

In this way, after obtaining the failure indication information, the network side device may determine information about the target transmission path on which data transmission fails, so that the target transmission path may not be configured for data transmission, to improve data transmission reliability.

Optionally, the first operation includes at least one of:

resetting the target RLC entity;

suspending a data sending function and/or a data receiving function of the target RLC entity;

resetting all RLC entities corresponding to an SCell corresponding to the target RLC entity; or suspending data sending functions and/or data receiving functions of all the RLC entities corresponding to the SCell corresponding to the target RLC entity.

The target RLC entity may correspond to one or more SCells.

In this way, the target RLC entity and/or all the RLC entities corresponding to the SCell corresponding to the target RLC entity are reset, and/or the data sending function and/or the data receiving function of the target RLC entity and/or the data sending functions and/or the data receiving functions of all the RLC entities corresponding to the SCell corresponding to the target RLC entity are suspended, so that data transmission can be resumed as soon as possible, to improve data transmission reliability.

Optionally, the second operation includes at least one of:
skipping triggering reporting of a buffer size report BSR of a logical channel of the target transmission path;
a generated BSR does not include buffer data corresponding to the logical channel of the target transmission path; or
in a process of performing logical channel prioritization LCP, allocating a received uplink grant to another logical channel other than the logical channel of the target transmission path.

For a scenario in which the generated buffer size report (BSR) does not include the buffer data corresponding to the logical channel of the target transmission path, it should be understood that a reporting triggering condition of the BSR is not limited in this embodiment of this application. Compared with a case in which reporting of the buffer size report BSR of the logical channel of the target transmission path is not triggered, buffer data corresponding to a logical channel of another target transmission path may be reported, and transmission on another transmission path is not affected, to improve data transmission reliability.

For a scenario in which in the process of performing logical channel prioritization LCP, the received uplink grant is allocated to another logical channel other than the logical channel of the target transmission path, it may be understood that in the process of performing logical channel prioritization LCP, the UE does not allocate the received uplink grant to the logical channel of the target transmission path, to reduce a data loss.

In this way, data transmission performance can be improved.

Optionally, the third operation includes at least one of:
deactivating an SCell corresponding to the target RLC entity; or
stopping uplink signal sending and/or downlink signal receiving in the SCell corresponding to the target RLC entity.

In this way, the SCell corresponding to the target RLC entity is not used for data transmission, to avoid a data loss, and improve data transmission performance.

Optionally, the fourth operation includes at least one of:
when a data duplication function is configured for the target split bearer, deactivating a data duplication function of the target transmission path;
when the data duplication function is configured for the target split bearer, if an initial available transmission path of the target split bearer includes the target transmission path, updating the initial available transmission path to a transmission path that does not include a transmission path corresponding to the target RLC entity; or
when the data duplication function is configured for the target split bearer, if data transmission of all RLC entities corresponding to the target split bearer fails, and all the RLC entities corresponding to the target split bearer are configured to perform sending in the SCell, performing at least one of: suspending the target split bearer; re-establishing a packet data convergence protocol PDCP entity corresponding to the target split bearer; or resetting the target MAC entity.

Updating the initial available transmission path to the transmission path that does not include the transmission path corresponding to the target RLC entity may be understood as changing the initial available transmission path to a transmission path corresponding to an RLC entity in which no data transmission failure occurs.

In this way, it can be avoided that data is still transmitted by using the target transmission path, to improve data transmission reliability.

It should be noted that in this embodiment of this application, the transmission path may be identified by using at least one of: a cell group identifier or a logical channel identifier.

In the processing method in this embodiment, the N transmission paths are configured for the target split bearer corresponding to the terminal, data transmission on the M transmission paths in the N transmission paths is performed by using the secondary cell SCell, N is an integer greater than or equal to 2, and M is a positive integer less than or equal to N. When the data transmission on the target transmission path in the M transmission paths fails, the terminal may perform at least one of the following operations: reporting the failure indication information; performing the first operation on the target RLC entity corresponding to the target transmission path; performing the second operation on the target MAC entity corresponding to the target transmission path; performing the third operation on the target SCell corresponding to the target transmission path; or performing the fourth operation on the target split bearer. It can be learned that in this application, processing behavior of UE is configured for a scenario in which data transmission on a transmission path, on which data transmission is performed by using the SCell, in the N transmission paths of the target split bearer fails, to improve data transmission reliability and improve data transmission performance.

It should be noted that the plurality of optional implementations described in this embodiment of this application may be implemented in combination with each other or may be implemented separately. This is not limited in this embodiment of this application.

For case of understanding, example descriptions are as follows:

Embodiment 1: Data Transmission on a Transmission Path in an MCG Fails

Figure 5:
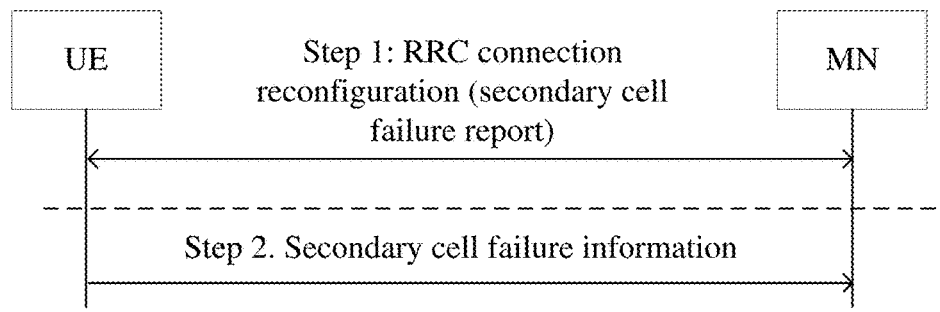
FIG. 5 is a second flowchart of a bearer control method according to an embodiment of this application.

As shown in FIG. 5, a processing method in this embodiment may include the following steps.

Step 1. An MN Sends a Secondary Cell Failure Report to UE.

The secondary cell failure report is used to instruct a terminal to report failure indication information when a failure occurs on a path on which data can be transmitted only by using an SCell, and may be equivalent to the first indication information in the foregoing method embodiment. During specific implementation, a network side device may configure a secondary cell failure report by using an RRC connection reconfiguration process.

During actual application, the following content is configured on a network side or agreed in a protocol: When a split bearer corresponds to at least two (namely, a quantity of corresponding RLC entities or logical channels) sending paths in at least one MAC entity, and the sending paths of the split bearer include at least one path on which data can be sent only by using an SCell (for example, when a MAC entity of the UE performs an LCP process, the logical channel can be allocated an uplink resource of an uplink grant only when the uplink grant is an uplink grant of a specified SCell (namely, an SCell configured for the network)), the UE reports the failure indication information when a failure occurs on the path on which data can be sent only by using the SCell.

Step 2. When the path on which a failure occurs is a path of MAC in an MCG, the UE reports the failure indication information by using an SRB (for example, an SRB1 or an SRB2) of the MCG, where the failure indication information may be represented as secondary cell failure information (SCell Failure Information).

A triggering event of the failure includes one of or any combination of a plurality of the following:
- an RLC entity corresponding to the path reaches a largest quantity of times of retransmission;
- a physical layer of an SCell corresponding to the path is out of synchronization;
- a random access process of the SCell corresponding to the path fails; and
- a beam failure occurs in the SCell corresponding to the path.

Content of the reported "failure indication information" includes one of or any combination of a plurality of the following:
- an identifier of a cell in which a failure occurs;
- an identifier of a cell group in which a failure occurs;
- an identifier of a bearer in which a failure occurs;
- an identifier of an RLC entity in which a failure occurs;
- an identifier of a logical channel corresponding to the RLC entity in which a failure occurs;
- an identifier of a logical channel group to which the logical channel of the RLC entity in which a failure occurs belongs;
- a measurement result of a cell of the RLC entity in which a failure occurs;
- measurement results of all serving cells;
- measurement results of cells of all serving frequencies;
- a measurement result of a serving cell of a cell group in which a failure occurs;
- a measurement result of a cell of a serving frequency of the cell group in which a failure occurs; and
- a measurement result of a cell of a non-serving frequency.

Content of the reported "measurement report" includes one of or any combination of a plurality of the following:
- a measurement result of a cell; and
- a measurement result of a beam of a cell.

In addition, processing behavior of the UE further includes:
- processing the RLC entity corresponding to the path on which a failure occurs;
- processing the SCell corresponding to the path on which a failure occurs;
- processing a MAC entity corresponding to the path on which a failure occurs; and
- processing a bearer corresponding to the path on which a failure occurs.

Behavior of "processing the RLC entity corresponding to the path on which a failure occurs" includes one of or any combination of a plurality of the following:
- resetting the RLC entity in which a failure occurs;
- suspending a data sending function of the RLC entity in which a failure occurs;
- suspending a data receiving function of the RLC entity in which a failure occurs;
- resetting all RLC entities corresponding to an SCell corresponding to the RLC entity in which a failure occurs;
- suspending data sending functions of all the RLC entities corresponding to the SCell corresponding to the RLC entity in which a failure occurs; and
- suspending data receiving functions of all the RLC entities corresponding to the SCell corresponding to the RLC entity in which a failure occurs.

Behavior of "processing the SCell corresponding to the path on which a failure occurs" includes one of or any combination of a plurality of the following:
- deactivating the SCell corresponding to the RLC entity in which a failure occurs;
- stopping uplink signal sending in the SCell corresponding to the RLC entity; and
- stopping downlink signal receiving in the SCell corresponding to the RLC entity.

Behavior of "processing the MAC entity corresponding to the path on which a failure occurs" includes one of or any combination of a plurality of the following:
- skipping triggering reporting of a BSR on a logical channel of the path on which a failure occurs;
- triggered reporting of a buffer size report (BSR) does not include reporting of buffer data corresponding to the logical channel of the path on which a failure occurs; and
- when the MAC entity performs an LCP process, skipping allocating a received uplink grant to the logical channel of the path on which a failure occurs.

Behavior of "processing the bearer corresponding to the path on which a failure occurs" includes one of or any combination of a plurality of the following:
- when PDCP duplication is configured, deactivating a PDCP duplication function of the path on which a failure occurs (in other words, the path on which a failure occurs is not used to send duplicate data);
- when the PDCP duplication is configured, if a default sending path (the default sending path is an uplink sending path that is used by the UE when no PDCP duplication is configured for the UE or after the PDCP duplication function of the entire bearer is deactivated) of a bearer for which the PDCP data duplication function is configured is a sending path corresponding to the RLC entity in which a failure occurs, changing the default sending path to a sending path corresponding to an RLC entity in which no failure occurs;
- when the PDCP duplication is configured, if a failure occurs in all RLC entities of the bearer for which the PDCP data duplication function is configured, and all the RLC entities are configured to perform sending in the SCell, suspending the bearer for which the PDCP data duplication function is configured (in other words, no data is sent or received);
- when the PDCP duplication is configured, if a failure occurs in all the RLC entities of the bearer for which the PDCP data duplication function is configured, and all the RLC entities are configured to perform sending in the SCell, re-establishing a PDCP entity corresponding to the bearer for which the PDCP data duplication function is configured; and
- when the PDCP duplication is configured, if a failure occurs in all the RLC entities of the bearer for which the PDCP data duplication function is configured, and all the RLC entities are configured to perform sending in the SCell, resetting a MAC entity corresponding to the bearer for which the PDCP data duplication function is configured.

Embodiment 2: Data Transmission on a Transmission Path in an SCG Fails, and Failure Indication Information is Reported by Using an SRB of the SCG As shown in FIG. 6, a processing method in this embodiment may include the following steps.

Step 1. Same as step 1 in Embodiment 1, the following content is configured on a network side or agreed in a protocol: UE reports failure indication information when a triggering condition is met.

Figure 6:
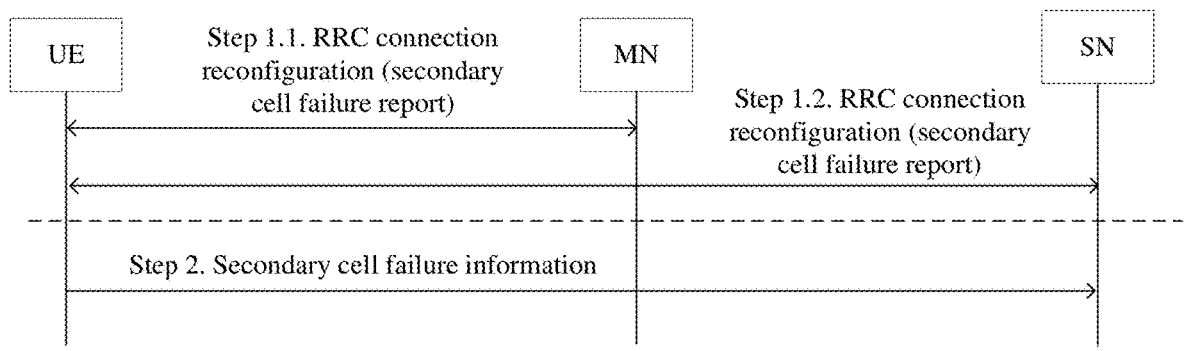
FIG. 6 is a third flowchart of a bearer control method according to an embodiment of this application.

As shown in FIG. 6, step 1 may include step 1.1 and/or step 1.2.

Step 1.1. An MN configures a secondary cell failure report by using an RRC connection reconfiguration process.

Step 1.2. An SN configures a secondary cell failure report by using an RRC connection reconfiguration process.

Step 2: Same as step 2 in Embodiment 1.

A difference lies in that when a path on which a failure occurs is a path of MAC in the SCG, when a corresponding SRB is configured for the SCG, the failure indication information is reported by using the SRB (for example, an SRB3) of the SCG.

Embodiment 3: Data Transmission on a Transmission Path in an SCG Fails, and Failure Indication Information is Reported by Using an SRB of an MCG As shown in FIG. 7, a processing method in this embodiment may include the following steps.

Step 1. Same as step 1 in Embodiment 1, the following content is configured on a network side or agreed in a protocol: UE reports failure indication information when a triggering condition is met.

Figure 7:
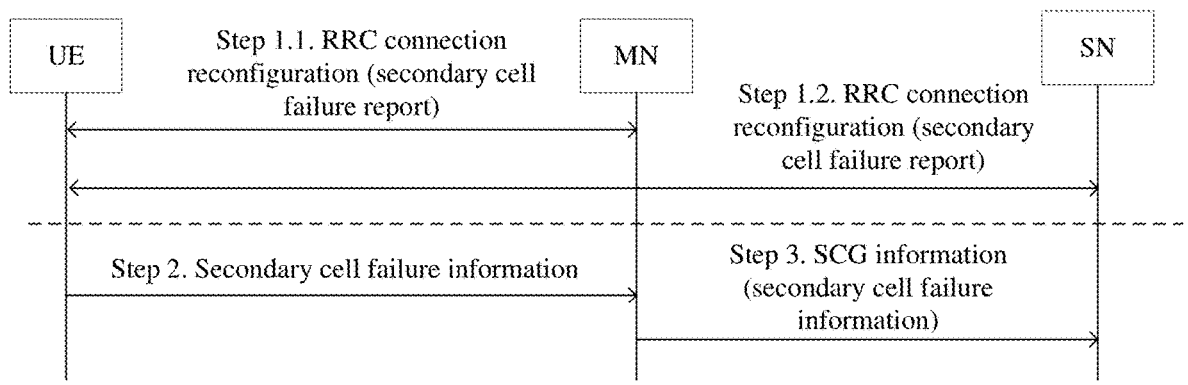
FIG. 7 is a fourth flowchart of a bearer control method according to an embodiment of this application.

As shown in FIG. 7, step 1 may include step 1.1 and/or step 1.2.

Step 1.1. An MN configures a secondary cell failure report by using an RRC connection reconfiguration process.

Step 1.2. An SN configures a secondary cell failure report by using an RRC connection reconfiguration process.

Step 2: Same as step 2 in Embodiment 1.

A difference lies in that when a path on which a failure occurs is a path of MAC in the SCG, when no corresponding SRB is configured for the SCG, the failure indication information is reported by using an SRB (for example, an SRB1 or an SRB2) of an MCG.

Step 3. In addition, the MN forwards, to the SN, the "failure indication information" reported by the UE.

As shown in FIG. 7, the MN sends SCG information to the SN, and the SCG information includes SCell failure information.

According to the method in this application, when a split bearer corresponds to multiple sending paths in one MAC entity, and the paths include at least one path on which data can be sent only by using the SCell, the UE performs related processing when a failure occurs on the path on which data can be sent only by using the SCell, to reduce a data loss and resume data sending as soon as possible.

Figure 8:
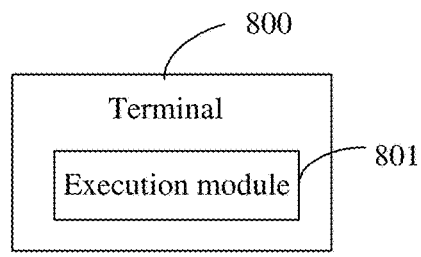
FIG. 8 is a first structural diagram of a terminal according to an embodiment of this application.

FIG. 8 is a first structural diagram of a terminal according to an embodiment of this application. N transmission paths are configured for a target split bearer corresponding to the terminal 800, data transmission on M transmission paths in the N transmission paths is performed by using a secondary cell SCell. N is an integer greater than or equal to 2, and M is a positive integer less than or equal to N. As shown in FIG. 8, the terminal 800 includes:

an execution module 801, configured to perform a target operation when data transmission on a target transmission path in the M transmission paths fails, where the target operation includes at least one of:
reporting failure indication information;
performing a first operation on a target radio link control RLC entity corresponding to the target transmission path;
performing a second operation on a target medium access control MAC entity corresponding to the target transmission path;
performing a third operation on a target SCell corresponding to the target transmission path; or performing a fourth operation on the target split bearer.

Optionally, when being configured to report the failure indication information, the first execution operation 801 may be configured to:
when the target transmission path corresponds to a MAC entity in a master cell group MCG, report the failure indication information by using a signaling radio bearer SRB configured for the MCG group; or
when the target transmission path corresponds to a MAC entity in a secondary cell group SCG and an SRB is configured for the SCG, report the failure indication information by using the SRB configured for the secondary cell group; or
when the target transmission path corresponds to a MAC entity in an SCG, but no SRB is configured for the SCG, report the failure indication information by using an SRB configured for an MCG.

Optionally, a triggering event of a failure of data transmission on the target transmission path includes at least one of:
a quantity of times of retransmission of the target RLC entity reaches a largest quantity of times of retransmission;
a failure occurs at a physical layer of the target SCell;
a random access process of the target SCell fails; or
a beam failure occurs in the target SCell.

Optionally, the execution module 801 may be configured to:
when the target operation includes reporting the failure indication information, report the failure indication information if first indication information instructs the terminal to report the failure indication information and data transmission on the target transmission path in the M transmission paths fails, where
the first indication information is used to instruct the terminal to report the failure indication information or not to report the failure indication information.

Optionally, the first indication information is configured by a network side device, or predefined in a protocol.

Optionally, the failure indication information includes at least one of:
an identifier of a cell corresponding to the target transmission path;
an identifier of a cell group corresponding to the target transmission path;
an identifier of the target split bearer;
an identifier of the target RLC entity;
an identifier of a logical channel of the target RLC entity;
an identifier of a logical channel group to which the logical channel of the target RLC entity belongs;
a measurement result of a cell of the target RLC entity;
measurement results of all serving cells;
measurement results of cells of all serving frequencies;
a measurement result of a serving cell of a cell group corresponding to the target transmission path;
a measurement result of a cell of a serving frequency of the cell group corresponding to the target transmission path; or
a measurement result of a cell of a non-serving frequency.

Optionally, the first operation includes at least one of:
resetting the target RLC entity;
suspending a data sending function and/or a data receiving function of the target RLC entity;
resetting all RLC entities corresponding to an SCell corresponding to the target RLC entity; or
suspending data sending functions and/or data receiving functions of all the RLC entities corresponding to the SCell corresponding to the target RLC entity.

Optionally, the second operation includes at least one of:
skipping triggering reporting of a buffer size report BSR of a logical channel of the target transmission path;
a generated BSR does not include buffer data corresponding to the logical channel of the target transmission path; or
in a process of performing logical channel prioritization LCP, allocating a received uplink grant to another logical channel other than the logical channel of the target transmission path.

Optionally, the third operation includes at least one of:
deactivating an SCell corresponding to the target RLC entity; or
stopping uplink signal sending and/or downlink signal receiving in the SCell corresponding to the target RLC entity.

Optionally, the fourth operation includes at least one of:
when a data duplication function is configured for the target split bearer, deactivating a data duplication function of the target transmission path;
when the data duplication function is configured for the target split bearer, if an initial available transmission path of the target split bearer includes the target transmission path, updating the initial available transmission path to a transmission path that does not include a transmission path corresponding to the target RLC entity; or
when the data duplication function is configured for the target split bearer, if data transmission of all RLC entities corresponding to the target split bearer fails, and all the RLC entities corresponding to the target split bearer are configured to perform sending in the SCell, performing at least one of: suspending the target split bearer; re-establishing a packet data convergence protocol PDCP entity corresponding to the target split bearer; or resetting the target MAC entity.

The terminal 800 can implement each process in the foregoing method embodiment in this application, and achieve same beneficial effects. To avoid repetition, details are not described herein again.

Figure 9:
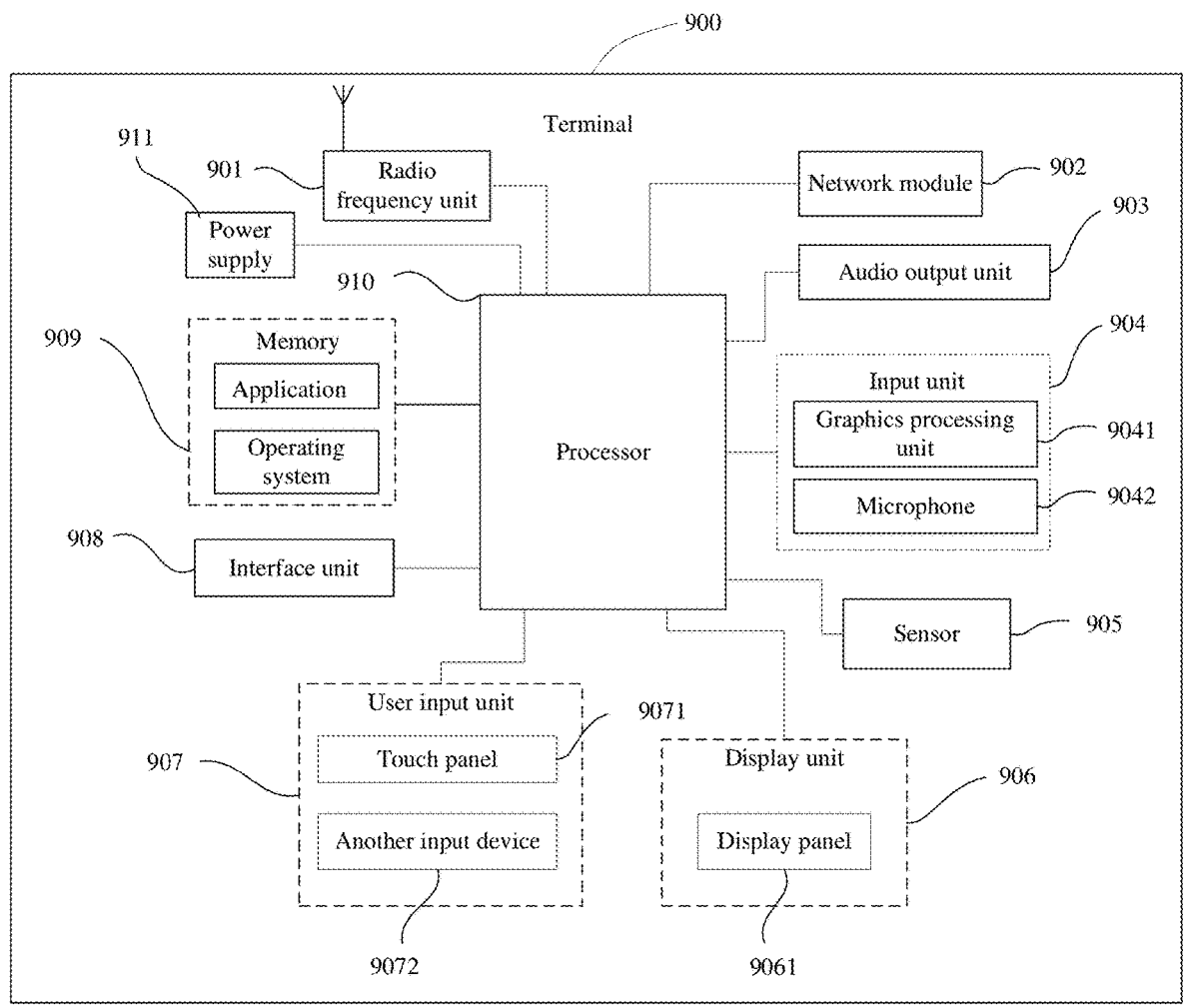
FIG. 9 is a second structural diagram of a terminal according to an embodiment of this application.

Referring to FIG. 9, FIG. 9 is a second structural diagram of a terminal according to an embodiment of this application. The terminal may implement the embodiments of this application. N transmission paths are configured for a target split bearer corresponding to the terminal 900, data transmission on M transmission paths in the N transmission paths is performed by using a secondary cell SCell, N is an integer greater than or equal to 2, and M is a positive integer less than or equal to N. As shown in FIG. 9, the terminal 900 includes, but not limited to: a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the terminal shown in FIG. 9 does not constitute a limitation to the terminal. The terminal may include more or fewer components than those shown in the figure, or some components may be combined, or there may be a different component arrangement. In this embodiment of this application, the terminal includes, but not limited to, a mobile phone, a tablet computer, a notebook computer, a palmtop computer, a vehicle-mounted terminal, a wearable device, a pedometer, or the like.

The processor 910 is configured to:
perform a target operation when data transmission on a target transmission path in the M transmission paths fails, where
the target operation includes at least one of:
reporting failure indication information;
performing a first operation on a target radio link control RLC entity corresponding to the target transmission path;
performing a second operation on a target medium access control MAC entity corresponding to the target transmission path;
performing a third operation on a target SCell corresponding to the target transmission path; or
performing a fourth operation on the target split bearer.

Optionally, the reporting failure indication information includes:
when the target transmission path corresponds to a MAC entity in a master cell group MCG, reporting the failure indication information by using a signaling radio bearer SRB configured for the MCG group; or
when the target transmission path corresponds to a MAC entity in a secondary cell group SCG and an SRB is configured for the SCG, reporting the failure indication information by using the SRB configured for the secondary cell group; or
when the target transmission path corresponds to a MAC entity in an SCG, but no SRB is configured for the SCG, reporting the failure indication information by using an SRB configured for an MCG.

Optionally, the processor 910 is further configured to:
a quantity of times of retransmission of the target RLC entity reaches a largest quantity of times of retransmission;
a failure occurs at a physical layer of the target SCell;
a random access process of the target SCell fails; and
a beam failure occurs in the target SCell.

Optionally, the performing a target operation when data transmission on a target transmission path in the M transmission paths fails includes:
when the target operation includes reporting the failure indication information, reporting the failure indication information if first indication information instructs the terminal to report the failure indication information and data transmission on the target transmission path in the M transmission paths fails, where
the first indication information is used to instruct the terminal to report the failure indication information or not to report the failure indication information.

Optionally, the first indication information is configured by a network side device, or predefined in a protocol.

Optionally, the failure indication information includes at least one of: an identifier of a cell corresponding to the target transmission path;
an identifier of a cell group corresponding to the target transmission path;
an identifier of the target split bearer;
an identifier of the target RLC entity;
an identifier of a logical channel of the target RLC entity;
an identifier of a logical channel group to which the logical channel of the target RLC entity belongs;
a measurement result of a cell of the target RLC entity;

measurement results of all serving cells;
measurement results of cells of all serving frequencies;
a measurement result of a serving cell of a cell group corresponding to the target transmission path;
a measurement result of a cell of a serving frequency of the cell group corresponding to the target transmission path; or
a measurement result of a cell of a non-serving frequency.
Optionally, the first operation includes at least one of:
resetting the target RLC entity;
suspending a data sending function and/or a data receiving function of the target RLC entity;
resetting all RLC entities corresponding to an SCell corresponding to the target RLC entity; or
suspending data sending functions and/or data receiving functions of all the RLC entities corresponding to the SCell corresponding to the target RLC entity.
Optionally, the second operation includes at least one of:
skipping triggering reporting of a buffer size report BSR of a logical channel of the target transmission path;
a generated BSR does not include buffer data corresponding to the logical channel of the target transmission path; or
in a process of performing logical channel prioritization LCP, allocating a received uplink grant to another logical channel other than the logical channel of the target transmission path.
Optionally, the third operation includes at least one of:
deactivating an SCell corresponding to the target RLC entity; or
stopping uplink signal sending and/or downlink signal receiving in the SCell corresponding to the target RLC entity.
Optionally, the fourth operation includes at least one of:
when a data duplication function is configured for the target split bearer, deactivating a data duplication function of the target transmission path;
when the data duplication function is configured for the target split bearer, if an initial available transmission path of the target split bearer includes the target transmission path, updating the initial available transmission path to a transmission path that does not include a transmission path corresponding to the target RLC entity; or
when the data duplication function is configured for the target split bearer, if data transmission of all RLC entities corresponding to the target split bearer fails, and all the RLC entities corresponding to the target split bearer are configured to perform sending in the SCell, performing at least one of: suspending the target split bearer; re-establishing a packet data convergence protocol PDCP entity corresponding to the target split bearer; or resetting the target MAC entity.

It should be noted that the terminal 900 in this embodiment can implement each process in the foregoing method embodiments in the embodiments of this application, and achieve same beneficial effects. To avoid repetition, details are not described herein again.

It should be understood that, in this embodiment of this application, the radio frequency unit 901 may be configured to receive and transmit information, or receive and transmit signals during a call. For example, the radio frequency unit receives downlink data from a base station, and transmits the downlink data to the processor 910 for processing; and in addition, transmits uplink data to the base station. Generally, the radio frequency unit 901 includes, but not limited to, an antenna, at least one amplifier, a transceiver, a coupler, a low noise amplifier, a duplexer, and the like. In addition, the radio frequency unit 901 may further communicate with a network and another device by using a wireless communications system.

The terminal provides wireless broadband Internet access for a user by using the network module 902, for example, helping the user send and receive an email, browse a web page, and access streaming media.

The audio output unit 903 may convert audio data received by the radio frequency unit 901 or the network module 902 or stored in the memory 909 into an audio signal and output the audio signal as a sound. In addition, the audio output unit 903 may further provide audio output (for example, a call signal received voice, or a message received voice) related to a specific function executed by the terminal 900. The audio output unit 903 includes a speaker, a buzzer, a receiver, and the like.

The input unit 904 is configured to receive audio or video signals. The input unit 904 may include a graphics processing unit (GPU) 9041 and a microphone 9042. The graphics processing unit 9041 processes image data of a static picture or a video obtained by an image capture apparatus (for example, a camera) in a video capture mode or image capture mode. A processed image frame may be displayed on the display unit 906. The image frame processed by the graphics processing unit 9041 may be stored in the memory 909 (or another storage medium) or sent via the radio frequency unit 901 or the network module 902. The microphone 9042 may receive a sound and can process such sound into audio data. The audio data obtained through processing may be converted, in a telephone call mode, into a format that can be sent to a mobile communications base station via the radio frequency unit 901 for output.

The terminal 900 further includes at least one sensor 905, such as a light sensor, a motion sensor, and another sensor. For example, the light sensor includes an ambient light sensor and a proximity sensor, where the ambient light sensor can adjust brightness of the display panel 9061 according to brightness of ambient light, and the proximity sensor can turn off the display panel 9061 and/or backlight when the terminal 900 is moved towards the ear. As a motion sensor, an accelerometer sensor can detect magnitude of acceleration in various directions (usually three axes), can detect magnitude and the direction of gravity when stationary, can be configured to implement functions related to terminal posture (for example, switching between a landscape mode and a portrait mode, related games, and magnetometer posture calibration) identification and vibration identification (for example, a pedometer and a knock), and the like. The sensor 905 may further include a fingerprint sensor, a pressure sensor, an iris sensor, a molecular sensor, a gyroscope, a barometer, a hygrometer, a thermometer, an infrared sensor, or the like. Details are not described herein.

The display unit 906 is configured to display information entered by a user or information provided for the user. The display unit 906 may include a display panel 9061, and the display panel 9061 may be configured in a form of a liquid crystal display (LCD), an organic light-emitting diode (OLED), or the like.

The user input unit 907 may be configured to receive input numeral or character information, and generate key signal input related to user setting and function control of the terminal. For example, the user input unit 907 includes a touch panel 9071 and another input device 9072. The touch panel 9071 is also referred to as a touchscreen, and may collect a touch operation performed by a user on or near the touch panel 9071 (for example, an operation performed by a user on the touch panel 9071 or near the touch panel 9071 by using any proper object or accessory such as a finger or a stylus). The touch panel 9071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touch point coordinates, sends the touch point coordinates to the processor 910, and receives and executes a command from the processor 910. In addition, the touch panel 9071 may be implemented in various types such as a resistor, a capacitor, an infrared ray, or a surface acoustic wave. In addition to the touch panel 9071, the user input unit 907 may include the another input device 9072. For example, the another input device 9072 may include, but not limited to, a physical keyboard, function keys (for example, a volume control key and a switch key), a trackball, a mouse, and a joystick. Details are not described herein.

Further, the touch panel 9071 can cover the display panel 9061. When detecting a touch operation on or near the touch panel 9071, the touch panel 9071 transmits the touch operation to the processor 910 to determine a type of a touch event. Then, the processor 910 provides corresponding visual output on the display panel 9061 based on the type of the touch event. Although in FIG. 9, the touch panel 9071 and the display panel 9061 are used as two independent components to implement input and output functions of the terminal, in some embodiments, the touch panel 9071 and the display panel 9061 may be integrated to implement the input and output functions of the mobile terminal. This is not specifically limited herein.

The interface unit 908 is an interface for connecting an external apparatus to the terminal 900. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 908 may be configured to receive an input (for example, data information and power) from the external apparatus and transmit the received input to one or more elements in the terminal 900, or transmit data between the terminal 900 and the external apparatus.

The memory 909 may be configured to store software programs and various data. The memory 909 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 909 may include a high-speed random access memory, and may further include a non-volatile memory, for example, at least one magnetic disk storage device, a flash memory device, or another volatile solid-state storage device.

The processor 910 is a control center of the terminal, and connects all parts of the entire terminal by using various interfaces and lines. By running or executing a software program and/or a module stored in the memory 909 and invoking data stored in the memory 909, the processor 910 performs various functions of the terminal and data processing, to perform overall monitoring on the terminal. The processor 910 may include one or more processing units.

Optionally, the processor 910 may be integrated with an application processor and a modem processor. The application processor mainly processes the operating system, the user interface, applications, and the like. The modem processor mainly processes wireless communication. It may be understood that the modem processor may not be integrated into the processor 910.

The terminal 900 may also include the power supply 911 (for example, a battery) that supplies power to various components. Optionally, the power supply 911 may be logically connected to the processor 910 by using a power supply management system, to implement functions of managing charging, discharging, and power consumption by using the power supply management system.

In addition, the terminal 900 includes some functional modules not shown. Details are not described herein.

Optionally, an embodiment of this application further provides a terminal, including a processor 910, a memory 909, and a computer program that is stored in the memory 909 and executable on the processor 910. When the computer program is executed by the processor 910, processes of the foregoing processing method embodiment are implemented, and same technical effects can be achieved. To avoid repetition, details are not described herein again.

An embodiment of this application further provides a non-transitory computer readable storage medium. The non-transitory computer readable storage medium stores a computer program. When the computer program is executed by a processor, processes of the foregoing processing method embodiment are implemented, and same technical effects can be achieved. To avoid repetition, details are not described herein again. The non-transitory computer readable storage medium is, for example, a read-only memory (ROM for short), a random access memory (RAM for short), a magnetic disk, or an optical disc.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. Without being subject to further limitations, an element defined by a phrase "including a . . . " does not exclude presence of other identical elements in the process, method, article, or apparatus that includes the very element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the related technology may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from the protection scope of aims of this application and claims, all of which fall within the protection of this application.

What is claimed is:

1. A processing method, applied to a terminal, wherein N transmission paths are configured for a target split bearer corresponding to the terminal, data transmission on M transmission paths in the N transmission paths is performed by using a secondary cell (SCell), N is an integer greater than or equal to 2, M is a positive integer less than or equal to N, and the method comprises:
performing a target operation when data transmission on a target transmission path in the M transmission paths fails, wherein
the target operation comprises: reporting failure indication information; wherein
the failure indication information comprises an identifier of a cell group corresponding to the target transmission path and an identifier of a logical channel of a target radio link control (RLC) entity corresponding to the target transmission path; wherein
the target operation further comprises performing a second operation on a target medium access control (MAC) entity corresponding to the target transmission path, wherein the second operation comprises at least one of:
skipping triggering reporting of a buffer size report (BSR) of a logical channel of the target transmission path;
generating a BSR that does not comprise buffer data corresponding to the logical channel of the target transmission path; or
in a process of performing logical channel prioritization (LCP), allocating a received uplink grant to another logical channel other than the logical channel of the target transmission path.

2. The method according to claim 1, further comprising:
when the target transmission path corresponds to a MAC entity in a master cell group (MCG), reporting the failure indication information by using a signaling radio bearer (SRB) configured for the MCG group; or
when the target transmission path corresponds to a MAC entity in a secondary cell group (SCG) and an SRB is configured for the SCG, reporting the failure indication information by using the SRB configured for the secondary cell group; or
when the target transmission path corresponds to a MAC entity in an SCG, but no SRB is configured for the SCG, reporting the failure indication information by using an SRB configured for an MCG.

3. The method according to claim 1, wherein a triggering event of a failure of data transmission on the target transmission path comprises at least one of:
a quantity of times of retransmission of the target RLC entity reaches a largest quantity of times of retransmission;
a failure occurs at a physical layer of the target SCell;
a random access process of the target SCell fails; or
a beam failure occurs in the target SCell.

4. The method according to claim 1, wherein the performing a target operation when data transmission on a target transmission path in the M transmission paths fails comprises:
when the target operation comprises reporting the failure indication information, reporting the failure indication information if first indication information instructs the terminal to report the failure indication information and data transmission on the target transmission path in the M transmission paths fails, wherein
the first indication information is used to instruct the terminal to report the failure indication information or not to report the failure indication information.

5. The method according to claim 4, wherein the first indication information is configured by a network side device, or predefined in a protocol.

6. The method according to claim 1, wherein the failure indication information further comprises at least one of:
an identifier of a cell corresponding to the target transmission path;
an identifier of the target split bearer;
an identifier of the target RLC entity;
an identifier of a logical channel group to which the logical channel of the target RLC entity belongs;
a measurement result of a cell of the target RLC entity;
measurement results of all serving cells;
measurement results of cells of all serving frequencies;
a measurement result of a serving cell of a cell group corresponding to the target transmission path;
a measurement result of a cell of a serving frequency of the cell group corresponding to the target transmission path; or
a measurement result of a cell of a non-serving frequency.

7. The method according to claim 1, wherein the target operation further comprises performing a first operation on the target RLC entity corresponding to the target transmission path, wherein the first operation comprises at least one of:
resetting the target RLC entity;
suspending a data sending function and/or a data receiving function of the target RLC entity;
resetting all RLC entities corresponding to an SCell corresponding to the target RLC entity; or
suspending data sending functions and/or data receiving functions of all the RLC entities corresponding to the SCell corresponding to the target RLC entity.

8. The method according to claim 1, wherein the target operation further comprises performing a third operation on a target SCell corresponding to the target transmission path, wherein the third operation comprises at least one of:
deactivating an SCell corresponding to the target RLC entity; or
stopping uplink signal sending and/or downlink signal receiving in the SCell corresponding to the target RLC entity.

9. The method according to claim 1, wherein the target operation further comprises performing a fourth operation on the target split bearer, wherein the fourth operation comprises at least one of:
when a data duplication function is configured for the target split bearer, deactivating a data duplication function of the target transmission path;
when the data duplication function is configured for the target split bearer, if an initial available transmission path of the target split bearer comprises the target transmission path, updating the initial available transmission path to a transmission path that does not comprise a transmission path corresponding to the target RLC entity; or
when the data duplication function is configured for the target split bearer, if data transmission of all RLC entities corresponding to the target split bearer fails, and all the RLC entities corresponding to the target split bearer are configured to perform sending in the SCell, performing at least one of: suspending the target split bearer; re-establishing a packet data convergence protocol (PDCP) entity corresponding to the target split bearer; or resetting the target MAC entity.

10. A terminal, comprising a processor, a memory, and a computer program that is stored in the memory and executable on the processor, wherein N transmission paths are configured for a target split bearer corresponding to the terminal, data transmission on M transmission paths in the N transmission paths is performed by using a secondary cell (SCell), N is an integer greater than or equal to 2, M is a positive integer less than or equal to N;

the computer program, when executed by the processor, causes the terminal to perform a target operation when data transmission on a target transmission path in the M transmission paths fails, wherein the target operation comprises: reporting failure indication information; wherein the failure indication information comprises an identifier of a cell group corresponding to the target transmission path and an identifier of a logical channel of a target radio link control (RLC) entity corresponding to the target transmission path; wherein the target operation further comprises performing a second operation on a target medium access control (MAC) entity corresponding to the target transmission path, wherein the second operation comprises at least one of:

skipping triggering reporting of a buffer size report (BSR) of a logical channel of the target transmission path;

generating a BSR that does not comprise buffer data corresponding to the logical channel of the target transmission path; or in a process of performing logical channel prioritization (LCP), allocating a received uplink grant to another logical channel other than the logical channel of the target transmission path.

11. The terminal according to claim 10, wherein the computer program, when executed by the processor, causes the terminal to further perform:

when the target transmission path corresponds to a MAC entity in a master cell group (MCG), reporting the failure indication information by using a signaling radio bearer (SRB) configured for the MCG group; or when the target transmission path corresponds to a MAC entity in a secondary cell group (SCG) and an SRB is configured for the SCG, reporting the failure indication information by using the SRB configured for the secondary cell group; or when the target transmission path corresponds to a MAC entity in an SCG, but no SRB is configured for the SCG, reporting the failure indication information by using an SRB configured for an MCG.

12. The terminal according to claim 10, wherein a triggering event of a failure of data transmission on the target transmission path comprises at least one of:

a quantity of times of retransmission of the target RLC entity reaches a largest quantity of times of retransmission;

a failure occurs at a physical layer of the target SCell;

a random access process of the target Scell fails; or a beam failure occurs in the target Scell.

13. The terminal according to claim 10, wherein the computer program, when executed by the processor, causes the terminal to perform:

when the target operation comprises reporting the failure indication information, reporting the failure indication information if first indication information instructs the terminal to report the failure indication information and data transmission on the target transmission path in the M transmission paths fails; the first indication information is used to instruct the terminal to report the failure indication information or not to report the failure indication information, and the first indication information is configured by a network side device, or predefined in a protocol.

14. The terminal according to claim 10, wherein the failure indication information further comprises at least one of:

an identifier of a cell corresponding to the target transmission path;

an identifier of the target split bearer;

an identifier of the target RLC entity;

an identifier of a logical channel group to which the logical channel of the target RLC entity belongs;

a measurement result of a cell of the target RLC entity;

measurement results of all serving cells;

measurement results of cells of all serving frequencies;

a measurement result of a serving cell of a cell group corresponding to the target transmission path;

a measurement result of a cell of a serving frequency of the cell group corresponding to the target transmission path; or a measurement result of a cell of a non-serving frequency.

15. The terminal according to claim 10, wherein the target operation further comprises performing a first operation on the target RLC entity corresponding to the target transmission path, wherein the first operation comprises at least one of:

resetting the target RLC entity;

suspending a data sending function and/or a data receiving function of the target RLC entity;

resetting all RLC entities corresponding to an Scell corresponding to the target RLC entity; or suspending data sending functions and/or data receiving functions of all the RLC entities corresponding to the Scell corresponding to the target RLC entity.

16. The terminal according to claim 10, wherein the target operation further comprises performing a third operation on a target Scell corresponding to the target transmission path, wherein the third operation comprises at least one of:

deactivating an Scell corresponding to the target RLC entity; or stopping uplink signal sending and/or downlink signal receiving in the Scell corresponding to the target RLC entity.

17. The terminal according to claim 10, wherein the target operation further comprises performing a fourth operation on the target split bearer, wherein the fourth operation comprises at least one of:

when a data duplication function is configured for the target split bearer, deactivating a data duplication function of the target transmission path;

when the data duplication function is configured for the target split bearer, if an initial available transmission path of the target split bearer comprises the target transmission path, updating the initial available transmission path to a transmission path that does not comprise a transmission path corresponding to the target RLC entity; or when the data duplication function is configured for the target split bearer, if data transmission of all RLC entities corresponding to the target split bearer fails, and all the RLC entities corresponding to the target split bearer are configured to perform sending in the Scell, performing at least one of: suspending the target split bearer; re-establishing a packet data convergence protocol (PDCP) entity corresponding to the target split bearer; or resetting the target MAC entity.

18. A non-transitory computer readable storage medium, wherein the non-transitory computer readable storage medium stores a computer program, and the computer program, when executed by a processor, causes a terminal including the processor to perform a target operation when data transmission on a target transmission path in M transmission paths fails;

the M transmission paths are transmission paths in N transmission paths performed by using a secondary cell (Scell), the N transmission paths are transmission paths configured for a target split bearer corresponding to the terminal, N is an integer greater than or equal to 2, and M is a positive integer less than or equal to N; and the target operation comprises: reporting failure indication information; wherein the failure indication information comprises an identifier of a cell group corresponding to the target transmission path and an identifier of a logical channel of a target radio link control (RLC) entity corresponding to the target transmission path; wherein the target operation further comprises performing a second operation on a target medium access control (MAC) entity corresponding to the target transmission path, wherein the second operation comprises at least one of:

skipping triggering reporting of a buffer size report (BSR) of a logical channel of the target transmission path;

generating a BSR that does not comprise buffer data corresponding to the logical channel of the target transmission path; or in a process of performing logical channel prioritization (LCP), allocating a received uplink grant to another logical channel other than the logical channel of the target transmission path.

* * * * *